United States Patent [19]

Tanaka

[11] 4,334,316

[45] Jun. 8, 1982

[54] PRE-DETECTION MAXIMAL RATIO COMBINING SYSTEM FOR DIVERSITY RECEPTION OF RADIO FREQUENCY SIGNALS

[75] Inventor: Motomichi Tanaka, Tokyo, Japan

[73] Assignee: Nippon Electric Co., Ltd., Tokyo, Japan

[21] Appl. No.: 201,642

[22] Filed: Oct. 28, 1980

[30] Foreign Application Priority Data

Oct. 31, 1979 [JP] Japan ............................... 54-140557

[51] Int. Cl.³ ............................................. H04B 1/10
[52] U.S. Cl. ............................. 455/139; 343/100 CL; 455/276; 455/304
[58] Field of Search ................... 455/52, 65, 137–139, 455/273, 276, 278, 303, 304; 343/100 CL; 364/819, 728

[56] References Cited

U.S. PATENT DOCUMENTS 3,609,663  9/1971  Bickford et al. ................... 455/138
4,079,380  3/1978  Esry et al. ..................... 343/100 CL Primary Examiner—Marc E. Bookbinder
Attorney, Agent, or Firm—Sughrue, Mion, Zinn, Macpeak & Seas

[57] ABSTRACT

A pre-detection maximal ratio combining system for a plurality of received signals is provided in which a plurality of control devices are arranged for controlling the phase and amplitude of each of a number of pre-detection signals corresponding to the received signals. The control devices operate by correlating the mutually orthogonal components of the pre-detection signals with a reference comparison signal, which is derived by combining the outputs of the several control devices into a combined signal, and normalizing the amplitude thereof.

3 Claims, 5 Drawing Figures

PRE-DETECTION MAXIMAL RATIO COMBINING SYSTEM FOR DIVERSITY RECEPTION OF RADIO FREQUENCY SIGNALS

BACKGROUND OF THE INVENTION

The present invention relates to a signal combining system for diversity reception.

Signal combining systems for diversity reception are classified into three different types, i.e., the selection type, linear combining (or equal-gain combining) type and non-linear combining type. Each of these systems is further classified into the pre-detection type and the post-detection type. Among these systems, the non-linear combining system, also known as the ratio squarer combining or maximal (or optimum) ratio combining system, is the most efficient, and many circuit structures of this system have been proposed and made available for practical use.

The maximal ratio combining of pre-detection signals requires phase control to keep signals received on diversity channels in phase with each other and amplitude control to weight voltage ratios between the received signals. Techniques of the prior art can be roughly classified into the following two categories from the viewpoints of phase control and amplitude control:

(1) The phase control is achieved with a phase lock loop while amplitude control is achieved via an envelope detection circuit and a multiplier, wherein the amplitude controlled is proportional to the square root of the autocorrelation of the input signal;

(2) Both phase and amplitude control is achieved with a regenerative feedback loop, wherein the weights for the amplitude control are the correlations between the normalized combined output signal and the received signals on individual channels. For the details of the technique of item (2), reference is made to J. R. Sharman, "Pre-detection Combining" in *Point-to-Point Communication*, VOL. 17, No. 3, published by Marconi Communication Systems Limited, September 1973.

Both these techniques always require, for combining predetection signals, heterodyne frequency conversion which never fails to shift the center frequency of a pre-detection signal, such as from a radio frequency into an intermediate frequency or from a first intermediate frequency into a second. This necessitates the preparation of a device for each signal frequency band, resulting in an economic disadvantage, apart from which the two systems have the following shortcomings.

The system of item (1) usually employs, for phase control, a voltage-controlled crystal oscillator (VCXO) in its phase lock loop. This VCXO, because its center frequency varies due to aging or other causes, may give rise to the unlocking of the loop, therefore involving a stability problem. The phase lock loop has to repeat the locking operation every time each channel is restored after a fade-out. In both cases, the unlocking phenomenon adversely affects reliability. Moreover, this system requires a detection circuit, multiplier and the like for amplitude control, separately from the circuit for the phase control.

On the other hand, the system of item (2) requires a narrow band-pass filter in its regenerative feedback loop. This narrow band-pass filter has to be a high-precision device such as a crystal filter for a pre-detection signal. Also, since this system, as stated above, requires the heterodyne frequency conversion, the succeeding demodulator and other components have to be suitable for a second intermediate frequency, which is different from the intermediate frequency on the modulation side. Hence, when a modulation-demodulation loop back test within a station is performed, a particular device is required for the heterodyne frequency conversion, resulting in inconvenience.

An object of the present invention therefore is to provide a simpler and more practical pre-detection signal maximal ratio combining system for diversity reception requiring no heterodyne frequency conversion, unlike similar systems of the prior art.

In accordance with the invention, there is provided a system for pre-detection maximal ratio combining of a plurality of received diversity signals, comprising: a plurality of control means for controlling the phase and amplitude of each of a plurality of pre-detection signals of the received diversity signals by correlating the mutually orthogonal components of each of the pre-detection signals with a reference comparison signal; means for combining the outputs of the plurality of control means; and means for normalizing the amplitude of the combined signal and respectively supplying this normalized signal, as the reference comparison signal, to the plurality of control means.

BRIEF DESCRIPTION OF THE DRAWINGS

Features and advantages of the present invention will be more apparent from the detailed description hereunder taken in conjunction with the accompanying drawings, wherein:

FIG. 1 illustrates an n-fold (n: a positive integer) diversity signal combining system including a phase lock loop. An input signal $S_{0i}$, where i represents the i-th of the first through n-th channels, passes through an antenna, preamplifier and the like (not illustrated) and is supplied to a mixer $1i$. This and other mixers are used for the heterodyne frequency conversion. A mixer $7i$ is used as a phase detector for detecting the phase difference between a combined output $S_3$, obtained by normalizing (amplifying to a certain reference level) the output from an adder 1 with a variable gain amplifier 2 and an automatic gain control (AGC) amplifier 3, and the output of a variable gain amplifier $10i$. The output of the mixer $7i$ is supplied through a loop filter $6i$ to a voltage-controlled crystal oscillator (VCXO) $5i$ to control the output frequency and phase of the VCXO $5i$. This VCXO $5i$ is so controlled in a negative feedback manner that the output frequency and phase of the variable gain amplifier $10i$ coincide with those of the combined output $S_3$ from the variable gain amplifier 2. The loop filter $6i$ serves to stabilize and restrict the noise band width of the phase lock loop.

Meanwhile, to control the amplitude for maximal ratio combining, the output of the variable gain amplifier 10i is envelope-detected with a detector 8i, whose output is passed through a low-pass filter (LPF) 9i to provide a D.C. signal proportional to the r.m.s. amplitude of the i-th channel, i.e., the square root of the autocorrelation. A multipler 4i multiplies the output of the amplifier 10i by the D.C. signal. A common AGC circuit 4 provides a common gain control to all variable gain amplifiers 101-10n with the detection output derived from the strongest signal among the received signals $S_{01}$-$S_{On}$. This procedure, serving to normalize the output of each of the amplifiers 101-10n with the r.m.s. value of the amplitude of the strongest signal, is indispensable for securing the dynamic range of a signal combining circuit.

In this system, because of the use of a phase lock loop for the phase control of each channel, the phase locked state may be lost if the input to each channel is reduced by deep fading, with the result that the output of the amplifier 10i is lowered by the common AGC below the reference level. For this reason, a suitable AGC-equipped auxiliary amplifier is usually inserted in the path of connection lines $l_1-l_n$.

Figure 1:
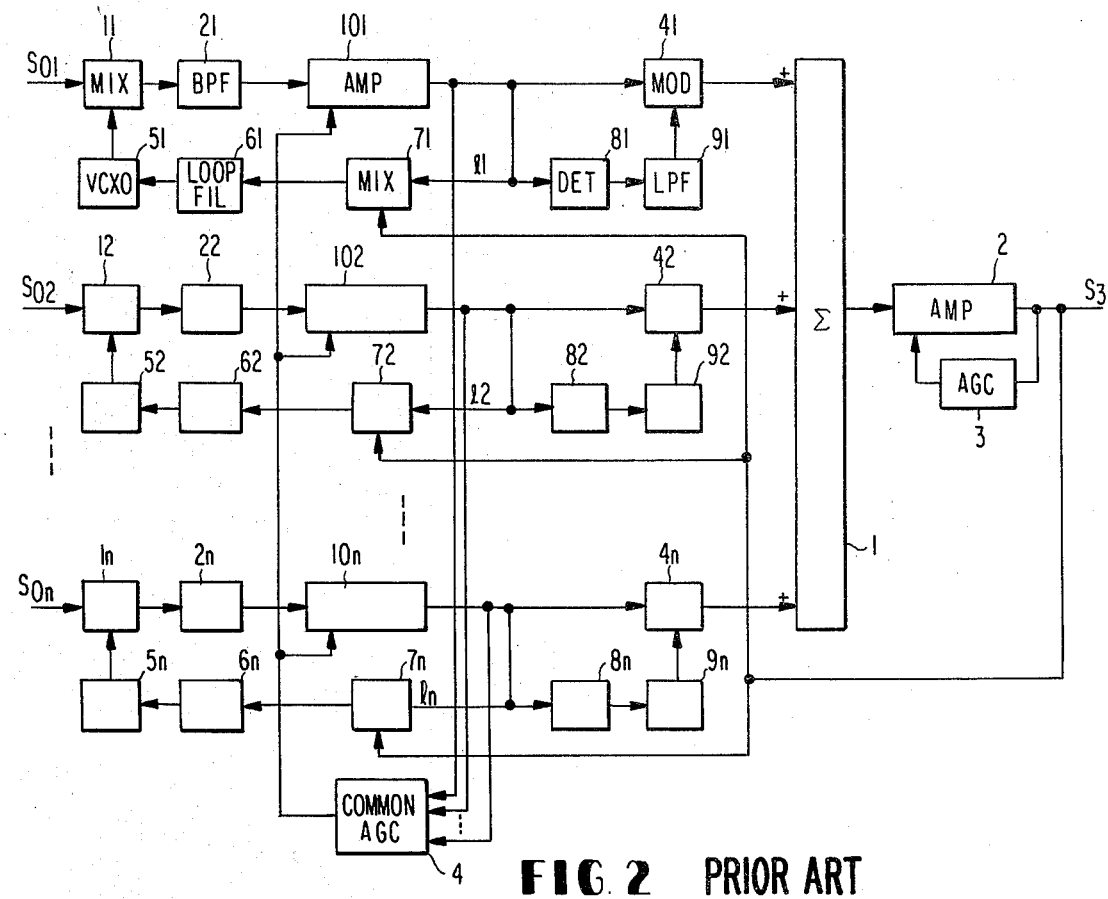
FIG. 1 is a block diagram illustrating the first of the aforementioned systems of the prior art in which phase control is achieved with a phase lock loop.

As already stated, the combining system illustrated in FIG. 1 has disadvantages such as the poor economy of heterodyne frequency conversion for phase control, degradation of reliability owing to the unlocking possibility of the phase lock loop, and the extra costs of detectors and multipliers for the amplitude control.

Figure 2:
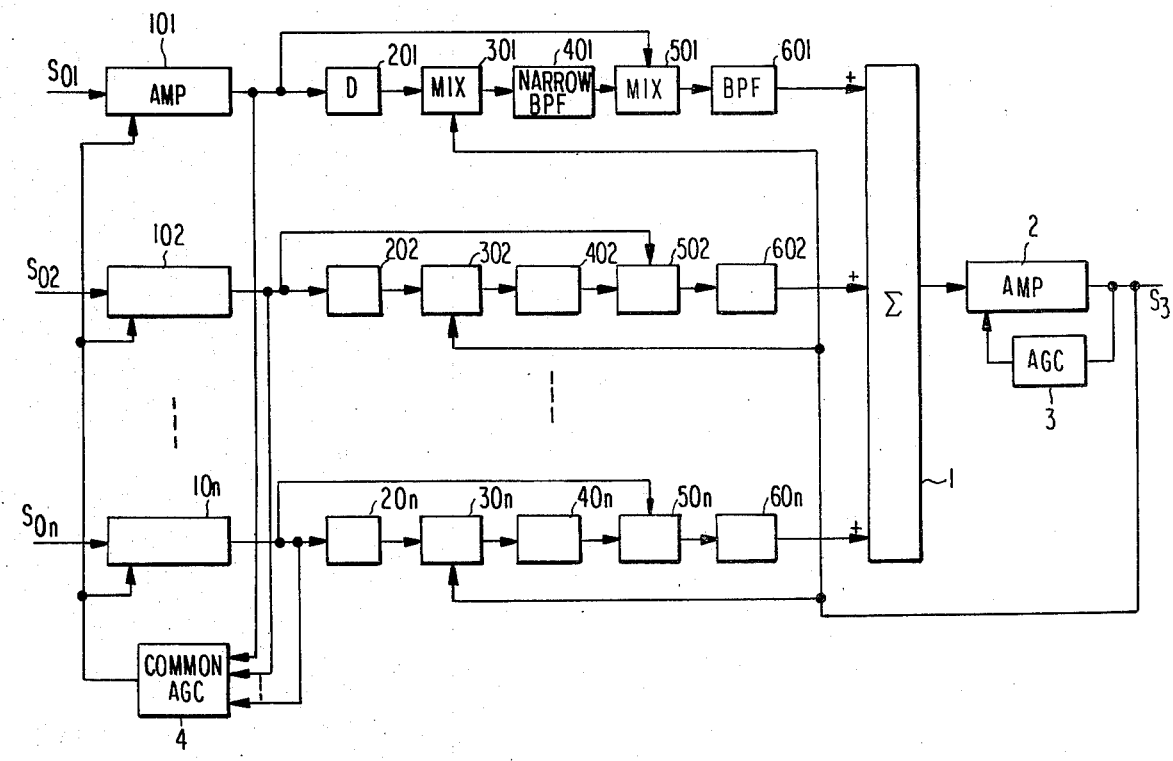
FIG. 2 is a block diagram illustrating the second of the aforementioned systems of the prior art in which phase control and amplitude control are achieved with a regenerative feedback loop.

FIG. 2 schematically illustrates a regenerative feedback loop-based system for combining n-fold diversity signals. The common AGC is applied in the same manner as in the system of FIG. 1. An input signal $S_{0i}$ having angular frequency $\omega_i$ and phase angle $(\phi_m+\theta_i)$ (where $\phi_m$ is a phase modulation term and $\theta_i$, a phase change due to fading or the like of the i-th channel), after passing a delay circuit 20, is multiplied by a combined output $S_3$, having angular frequency $\omega_\beta$ and phase angle $(\phi_m+\alpha)$ (where $\alpha$ is a phase angle not correlated to the input change $\theta_i$), in a mixer 30i. From the output of the mixer 30i, only a signal having angular frequency $(\omega_i-\omega_\beta)$ and phase angle $(\theta_i-\alpha)$ (where $\omega_i>\omega_\beta$) is selected by a narrow band-pass filter (BPF) 40i which only passes frequency variations due to fading or the like. The selected signal is multiplied by the input signal $S_{0i}$ in a mixer 50i, out of whose output only the signal of angular frequency $\omega_\beta$ and phase angle $(\phi_m+\alpha)$ is selected by a BPF 60i and then supplied to an adder 1.

After a regenerative feeback loop is constructed in this way, the combined output $S_3$ having angular frequency of $\omega_\beta$ and phase angle $(\phi_m+\alpha)$ contains no phase change $\theta_i$, and the combining of received diversity signals is thereby made possible. At the same time, amplitude control for maximal ratiq combining is achieved since the input signal $S_{0i}$ is multiplied by the output (proportional to the input signal $S_{0i}$) of the narrow BPF 40i, in the multiplier 50i. For further details of the system shown in FIG. 2, reference is made to Sharman's paper cited above. If an AGC amplifier or an amplitude limiter is connected to the output of the narrow BPF 40i, the resultant system will be one of linear combining (or equal-gain combining), for further information about which, reference is made to U.S. Pat. No. 3,471,788 to W. J. Bickford et al.

As seen from the foregoing description or Sharman's paper, the system of FIG. 2 involves the mixture of signals of three different bands, i.e., the first frequency ($\omega_i$) of the input signal $S_{0i}$, the second frequency ($\omega_\beta$) of the combined output $S_3$ as reference signal and the difference frequency ($\omega_i-\omega_\beta$), or the mixture of frequency bands owing to heterodyne frequency conversion, and consequently is uneconomical in device arrangement. Securing adequate reliability for the narrow BPF 40i makes the system costly, and there further is a disadvantage in the loop back test, as noted previously.

Figure 3:
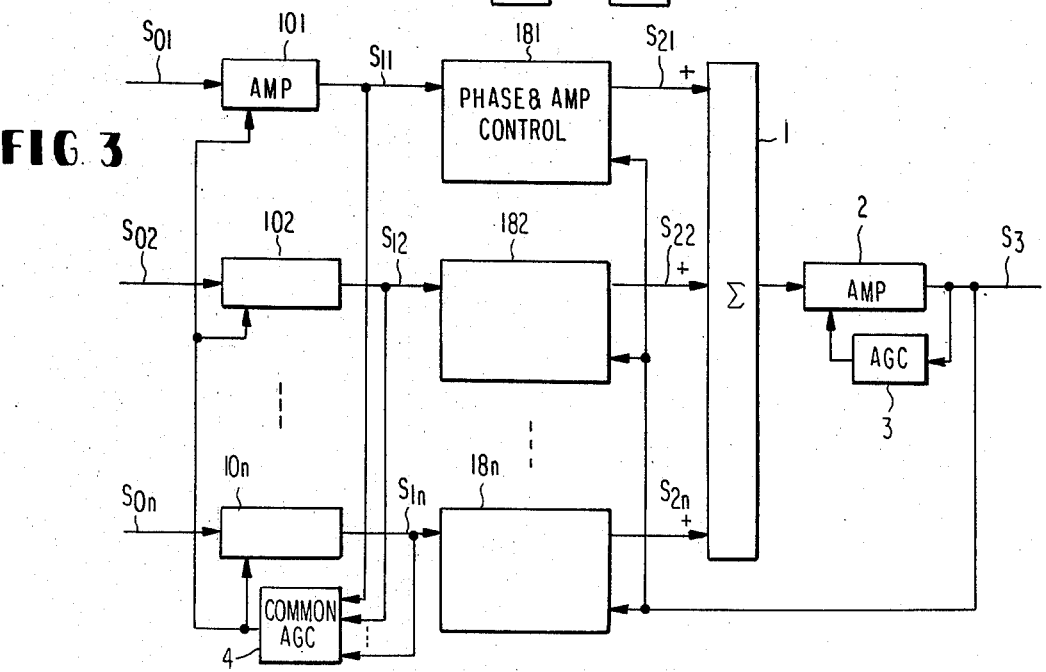
FIG. 3 illustrates the basic circuit structure of the pre-detection maximal ratio combining system in accordance with the present invention.

FIG. 3 shows a schematic block diagram of the system for maximal ratio combining of received diversity signals in accordance with the present invention. The combining of n-fold diversity inputs $S_{0i}$ will be first described. The arrangement, for securing the dynamic range of the signal combining circuit, to control variable gain amplifiers 101-10n of all channels with a common AGC circuit 4, and to achieve normalization with the amplitude of the channel having the strongest input signal is the same as in the conventional systems shown in FIGS. 1 and 2. The structure for maintaining the output of the adder 1 at a required level with a variable gain amplifier 2 and AGC amplifier 3 is also similar to that of the two prior art systems. A phase/amplitude control circuit 18i controls the phase and amplitude of the output $S_{1i}$ of the variable gain amplifiers 10i by correlating mutually orthogonal components of input signal $S_{1i}$ (that is, real and imaginary parts of the signal $S_{1i}$) with a final combined output $S_3$. The outputs $S_{2l}$-$S_{2n}$ of the control circuits 181-18n are combined by the adder 1.

Figure 4:
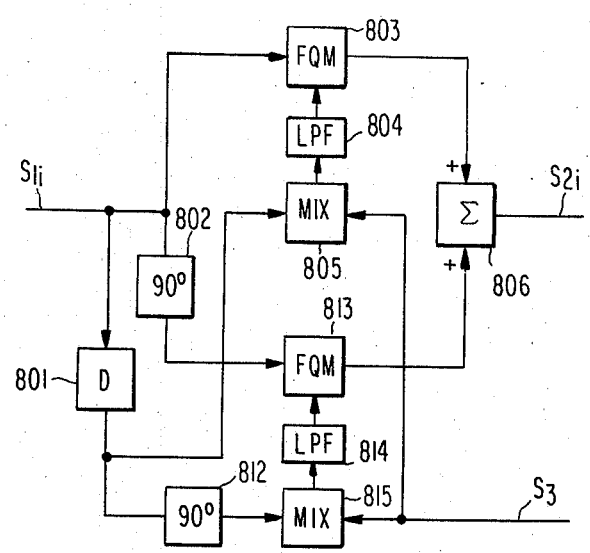
FIGS. 4 and 5 are schematic block diagrams of alternative examples of the phase and amplitude control circuit referred to in FIG. 3.

FIG. 4 is a block diagram of an example of the phase-/amplitude control circuit 18i in accordance with the present invention, wherein the reference numeral 801 denotes a delay circuit; 802 and 812, phase shifters for shifting by 90 degrees the phase of the signal input thereto, respectively; 803 and 813, four-quadrant multipliers for multiplying the pre-detection signal by the correlation signal between the signal $S_{1i}$ and the combined output $S_3$; 804 and 814, low-pass filters (LPFs) which pass only frequency changes owing to fading; 805 and 815, mixers for multiplying the pre-detection signals by each other; and 806, an adder. The 90° phase shifter 812 can be eliminated if a delay circuit is respectively used for the real and imaginary parts of the input signal $S_{1i}$.

The input signal $S_{1i}$ is defined, $$S_{1i} = Re\,[R_{1i}] \qquad (1)$$

$$R_{1i} = \sqrt{2}\ A_i e^{j(\omega_i t\ +\ \phi_m\ +\ \theta_i)}$$

and the final output signal $S_3$ in FIG. 3 is defined:

$$S_3 = Re\,[R_3] \qquad (2)$$

$$R_3 = e^{j(\omega_\beta t\ +\ \phi_m\ +\ \alpha)}$$

where
  $A_i$ is the r.m.s. amplitude of $S_{1i}$;
  $\omega_i$, the angular frequency term of $S_{1i}$;
  $\phi_m$, the phase modulation term of $S_{1i}$;
  $\theta_i$, the phase angle of $S_{1i}$;
  $\omega_\beta$, the angular frequency of $S_3$ ([the minimum value of $\omega_i$]$-\omega_c \leq \omega_\beta \leq$ [the maximum value of $\omega_i$]$+\omega_c$, where $\omega_c$ is the cut-off frequency of the LPF 804)
  $\alpha$, the phase angle of $S_3$; and
  Re [ ] represents the real part of the bracketed term. The amplitude of signal $S_3$ is normalized to a reference amplitude (=1) by the variable gain amplifier 2 and AGC amplifier 3 of FIG. 3.

The foregoing being supposed, when the delay times of the two signals fed to the mixers 805 and 815 through the delay circuit 801 are respectively brought into complete coincidence with each other, $S_{2i}$ will be:

$$S_{2i} = Re\,[R_{1i}] \cdot \overline{Re\,[R_{1i}] \cdot Re\,[R_3]} \qquad (3)$$

$$+ I_m\,[R_{1i}] \cdot \overline{I_m\,[R_{1i}] \cdot Re\,[R_3]}$$

where Im [ ] represents the imaginary part of the bracketed term and , the rejecting effect of the LPF 804 on the angular frequency $(\omega_i + \omega_\beta)$.

$$\begin{aligned}
\overline{Re\,[R_{1i}] \cdot Re\,[R_3]} &= \overline{\sqrt{2}\,A_i \cos(\omega_i t + \phi_m + \theta_i) \cdot \cos(\omega_\beta t + \theta_m + \alpha)} \\
&= \frac{\sqrt{2}}{2} A_i \cos\{(\omega_i - \omega_\beta)t + \theta_i - \alpha\} \\
\overline{I_m\,[R_{1i}] \cdot Re\,[R_3]} &= \overline{\sqrt{2}\,A_i \sin(\omega_i t + \phi_m + \theta_i) \cdot \cos(\omega_\beta t + \phi_m + \alpha)} \\
&= \frac{\sqrt{2}}{2} A_i \sin\{(\omega_i - \omega_\beta)t + \theta_i - \alpha\}
\end{aligned} \qquad (4)$$

Hence, $$\begin{aligned}
S_{2i} &= \sqrt{2}\,A_i \cos(\omega_i t + \phi_m + \theta_i) \cdot \frac{\sqrt{2}}{2} A_i \cos\{(\omega_i - \omega_\beta)t + \theta_i - \alpha\} \\
&+ \sqrt{2}\,A_i \sin(\omega_i + \phi_m + \theta_i) \cdot \frac{\sqrt{2}}{2} A_i \sin\{(\omega_i - \omega_\beta)t + \theta_i - \alpha\} \\
&= A_i^2\, Re\,[e^{j(\omega_i t + \phi_m + \theta_i)} \cdot e^{-j\{(\omega_i - \omega_\beta)t + \theta_i - \alpha\}}] \\
&= A_i^2\, Re\,[e^{j(\omega_\beta t + \phi_m + \alpha)}] \\
&= A_i^2\, S_3
\end{aligned} \qquad (5)$$

Equation (5) indicates that the phase/amplitude control circuits of FIG. 4 satisfy the conditions of maximal ratio combining, because the frequency and phase angle of the output signal $S_{2i}$ are respectively in coincidence with the frequency and phase of the reference comparison signal $S_3$ and the amplitude is the square of the r.m.s. value of $S_{1i}$.

Even though small center frequency offsets of pre-detection signals will be introduced by the control circuits constructed as shown in FIG. 4, there will not be a frequency conversion such as will shift the center frequencies of pre-detection signals, for instance, from a radio frequency to a first intermediate frequency and from a first intermediate frequency to a second.

Figure 5:
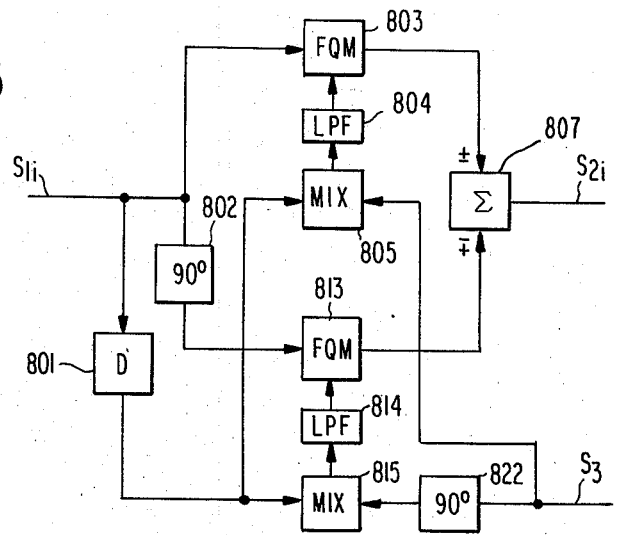

FIG. 5 is a block diagram of another example of the phase/amplitude control circuit 18i in accordance with the present invention. The circuit of FIG. 5 is a modified version of, and gives exactly the same output result as, that of FIG. 4. In FIG. 5, the reference numeral 807 denotes a subtractor, and the 90° phase shifter 822 is identical with the 90° phase shifter 802. When the circuit structure of FIG. 5 is to be built in that of FIG. 3, only one 90° phase shifter 822 will suffice because it can be shared by all the diversity channels.

As hitherto described, the signal combining system of the present invention does not require, for combining pre-detection signals of diversity reception, heterodyne frequency conversion intended for changing the frequency bands of passing signals. Thus the present system is highly suitable for a communications system that requires wide band performance, and makes it possible to overcome the disadvantages of conventional systems, including their poor economy owing to the co-presence of various devices.

What is claimed is:

1. A system for pre-detection maximal ratio combining of a plurality of received diversity signals, comprising:

a plurality of control means for controlling the phase and amplitude of each of a plurality of pre-detection signals, each of said control means including means to derive, from a respective pre-detection diversity signal, a set of mutually orthogonal components, means to correlate each component with a reference comparison signal and means to provide a control means output signal in response to the output of said correlation means.

means for combining the outputs of said plurality of control means to produce a combined signal; and means for normalizing the amplitude of the combined signal and respectively supplying this normalized signal, as said reference comparison signal, to said plurality of control means.

2. A system for pre-detection maximal ratio combining of a plurality of received diversity signals as claimed in claim 1, wherein each of said plurality of control means comprises: first phase shifting means for shifting the phase of said pre-detection signal by 90 degrees; means for delaying said pre-detection signal by a prescribed length of time; second phase shifting means for shifting the phase of the output of said delay means by 90 degrees; first and second multiplying means for respectively multiplying the outputs of said delaying means and said second phase shifting means by said reference comparison signal; first and second low pass filtering means for respectively filtering the outputs of said first and second multiplying means; third and fourth multiplying means for respectively multiplying said pre-detection signal and the output of said first phase shifting means by the outputs of said first and second low pass filtering means; and means for adding the outputs of said third and fourth multiplying means.

3. A system for pre-detection maximal ratio combining of a plurality of received diversity signals as claimed in claim 1, wherein each of said plurality of control means comprises: first phase shifting means for shifting the phase of said pre-detection signal by 90 degrees; means for delaying said pre-detection signal by a prescribed length of time; second phase shifting means for shifting the phase of said reference comparison signal by 90 degrees; first and second multiplying means for respectively multiplying the output of said delaying means by said reference comparison signal and the output of said second phase shifting means; first and second low pass filtering means for respectively filtering the outputs of said first and second multiplying means; third and fourth multiplying means for respectively multiplying the outputs of said first and second low pass filtering means by said pre-detection signal and the output of said first phase shifting means; and means for subtracting the output of said fourth multiplying means and that of said third multiplying means from each other.

* * * * *

UNITED STATES PATENT AND TRADEMARK OFFICE
CERTIFICATE OF CORRECTION

PATENT NO. : 4,334,316
DATED : June 8, 1982
INVENTOR(S) : Motomichi TANAKA

It is certified that error appears in the above—identified patent and that said Letters Patent is hereby corrected as shown below:

Column 1, line 42, change "predetection" to --pre-detection--;

Column 2, line 47, change "i" to -- $\underline{i}$ --;

Column 3, line 22, change "$1_1-1_n$" to -- $\ell_1-\ell_n$ --;

line 36, change "20," to -- 20i, --;

Column 4, line 26, change "18i-18n" to --18i-18n--;

Column 5, line 12, change "and     ," to --and $\overline{\phantom{xxx}}$ ,--;

Column 6, line 34, change "means." to --means;--.

Signed and Sealed this

Fourteenth Day of September 1982

[SEAL]

Attest:

GERALD J. MOSSINGHOFF

Attesting Officer     Commissioner of Patents and Trademarks